(12) United States Patent
Shah et al.

(10) Patent No.: US 8,762,508 B2
(45) Date of Patent: Jun. 24, 2014

(54) EFFECTIVELY MANAGING CONFIGURATION DRIFT

(75) Inventors: Shon K. Shah, Redmond, WA (US); Prasanna H. Sridhar, Bellevue, WA (US); James P. Finnigan, Redmond, WA (US); Srivatsan Parthasarathy, Bellevue, WA (US); Alan H. Goodman, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 12/721,579

(22) Filed: Mar. 11, 2010

(65) Prior Publication Data

US 2011/0225275 A1 Sep. 15, 2011

(51) Int. Cl.
*G06F 15/173* (2006.01)
*H04L 12/24* (2006.01)

(52) U.S. Cl.
CPC ................................. *H04L 41/0816* (2013.01)
USPC .......................................................... 709/223

(58) Field of Classification Search
CPC .. H04L 41/08; H04L 41/0803; H04L 41/0816
USPC .................................. 709/220–221, 224, 223
See application file for complete search history.

(56) References Cited

U.S. PATENT DOCUMENTS

| 6,098,098 | A * | 8/2000 | Sandahl et al. | 709/221 |
|---|---|---|---|---|
| 7,756,828 | B2 * | 7/2010 | Baron et al. | 707/634 |
| 7,783,800 | B2 * | 8/2010 | Staats et al. | 710/64 |
| 8,122,111 | B2 * | 2/2012 | Shekar et al. | 709/221 |
| 8,244,839 | B2 * | 8/2012 | Beaty et al. | 709/221 |
| 2003/0135609 | A1 * | 7/2003 | Carlson et al. | 709/224 |
| 2004/0128370 | A1 * | 7/2004 | Kortright | 709/221 |
| 2005/0080811 | A1 | 4/2005 | Speeter et al. | |
| 2006/0104220 | A1 * | 5/2006 | Yamazaki et al. | 370/254 |
| 2007/0006205 | A1 | 1/2007 | Kennedy et al. | |
| 2007/0203952 | A1 * | 8/2007 | Baron et al. | 707/200 |
| 2008/0028048 | A1 * | 1/2008 | Shekar et al. | 709/220 |
| 2008/0271025 | A1 * | 10/2008 | Gross et al. | 718/102 |

(Continued)

OTHER PUBLICATIONS

"Oracle Enterprise Manager 10g Business Intelligence Management Pack", Retrieved at<<http://www.oracle.com/technology/products/oem/pdf/ds_bi_mgmt_pack.pdf>., Feb. 20, 2009, pp. 3.

(Continued)

*Primary Examiner* — Jerry Dennison
(74) *Attorney, Agent, or Firm* — Jim Sfekas; Kate Drakos; Micky Minhas

(57) ABSTRACT

Configuration drift refers to changes made over time that cause a computer or service to deviate from a desired configuration. Configuration drift of a group of machines can be managed by defining configuration intent. Intent is defined by defining a configuration baseline comprised of a collection of related configuration rules. Configuration rules include settings, and targets which can be any managed entity that enables reporting of non-compliance at a more granular level. A configuration baseline can be completed by reading configuration rules from one or more well-configured computers. Configuration drift is assessed by comparing actual values to the configuration baseline values and is reported at a managed entity level instead of at a machine level. Remediation, returning the computer to a state of compliance with the configuration baseline, can be performed on demand. Remediations performed over time are retained and applied to a new instance of the service to eliminate configuration drift on the new instance.

18 Claims, 4 Drawing Sheets

(56) References Cited

U.S. PATENT DOCUMENTS

| | | | | |
|---|---|---|---|---|
| 2008/0320583 | A1* | 12/2008 | Sharma et al. | 726/12 |
| 2010/0077078 | A1* | 3/2010 | Suit et al. | 709/224 |
| 2010/0131625 | A1* | 5/2010 | Dehaan et al. | 709/221 |
| 2011/0225275 | A1* | 9/2011 | Shah et al. | 709/223 |
| 2011/0258299 | A1* | 10/2011 | Herlein et al. | 709/221 |
| 2012/0005318 | A1* | 1/2012 | Beaty et al. | 709/221 |

OTHER PUBLICATIONS

Solorzano Al., "Baseline Configuration, Auditing and Remediation Reports for Citrix Presentation Server", Retrieved at<<http://alsolorzano.com/blogs/tips_tricks/archive/2008/01/11/baseline-configuration-auditing-and-remediation-reports-for-citrix-presentation-server.aspx>>, Jan. 11, 2008, pp. 2.

"Best Practices for Repairing and Avoiding Configuration Shift and Drift", Retrieved at<<http://www.securitypronews.com/news/securitynews/spn-45-20040908ConfiguresoftCTOtoPresentat ISACAsInformation SecurityManagementConference.html>>, Sep. 8, 2004, pp. 2.

"Configuration Manager Preplanning Phase", Retrieved at<<http://technet.microsoft.com/en-us/library/bb632518.aspx>>, Jan. 21, 2010, p. 1.

"Desired Configuration Management feature of System Center Configuration Manager 2007", Retrieved at<<http://technet.microsoft.com/en-us/library/bb680553.aspx>>, Dec. 1, 2008, p. 1.

Eilam, T. et al. Managing the configuration complexity of distributed applications in internet data centers, IEEE communications magazine, vol. 44, No. 3. Mar. 2006, pp. 166-177. (Eilam, T. et al.).

Eilam, T. et al. Reducing the complexity of applications deployment in large data centers, IN: 2005 9th IRIP/IEEE International Symposium on Integrated Network Management, May 15-19, 2005, pp. 221-234. (Eilam, T. et al.).

Haber, E. M. et al. Design guidelines for system administration tools developed through ethnographic field studies, IN: the 2007 symposium on Computer human interactionf or the management of information technology, New York: ACM, 2007. (Haber, E.M. et al.).

Notification of Transmittal of the International Search Report and the Written Opinion of the International Searching Authority mailed Oct. 31, 2011.

Written Opinion of the International Searching Authority mailed Oct. 31, 2011.

"Configuration Management in the Data Center", Microsoft Corporation, May 2008, 10 pages.

"Managaing Data Center Server Compliance Using Microsoft System Center", Microsoft Corporation, Jun. 2008, 11 pages.

"System Center Configuration Manager", Microsoft System Center, Microsoft Corporation, 2008, 2 pages.

* cited by examiner

EFFECTIVELY MANAGING CONFIGURATION DRIFT

BACKGROUND

Data centers frequently manage complex server environments that include physical and virtual machines deployed across a variety of platforms, perhaps even in geographically separate locations. Because data centers can include hundreds or even thousands of servers, data center managers welcome tools that enable them to automate server provisioning and updating, to plan for data center expansion, and to otherwise help to deal with the many challenges of a data center environment.

It is estimated that as much as one half of unscheduled system downtime can be attributed to configuration problems. Configuration refers to the process of identifying and setting the values for attributes of hardware and software so that the system operates for a particular purpose. As administrators respond to the problems and needs that arise from day to day, servers can gradually become configured in ways that deviate from policies or standards. This process is called configuration drift.

SUMMARY

Managing multiple computers can rapidly get complicated if the computers are not configured similarly. Even for computers that are configured identically at the outset, configuration changes can occur over time. The greater the configuration drift, the more difficult it becomes to troubleshoot problems, making effective management and maintenance of the computers more difficult.

Software configuration drift for computers can be managed by defining a desired configuration, assessing a computer's deviation from the desired configuration (configuration drift) and remediating the computer (manually or automatically) to remove the configuration drift. A desired configuration can be defined by reading the configuration of one or more existing computers considered to be well-configured. Remediation of configuration drift can be performed in an automated and controlled manner. Service-associated deployment baselines and remediations can be integrated to prevent drift between the deployment images/assets and deployed systems to enable image-based servicing, redeployment, and scale-out without configuration drift.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Overview

Figure 1:
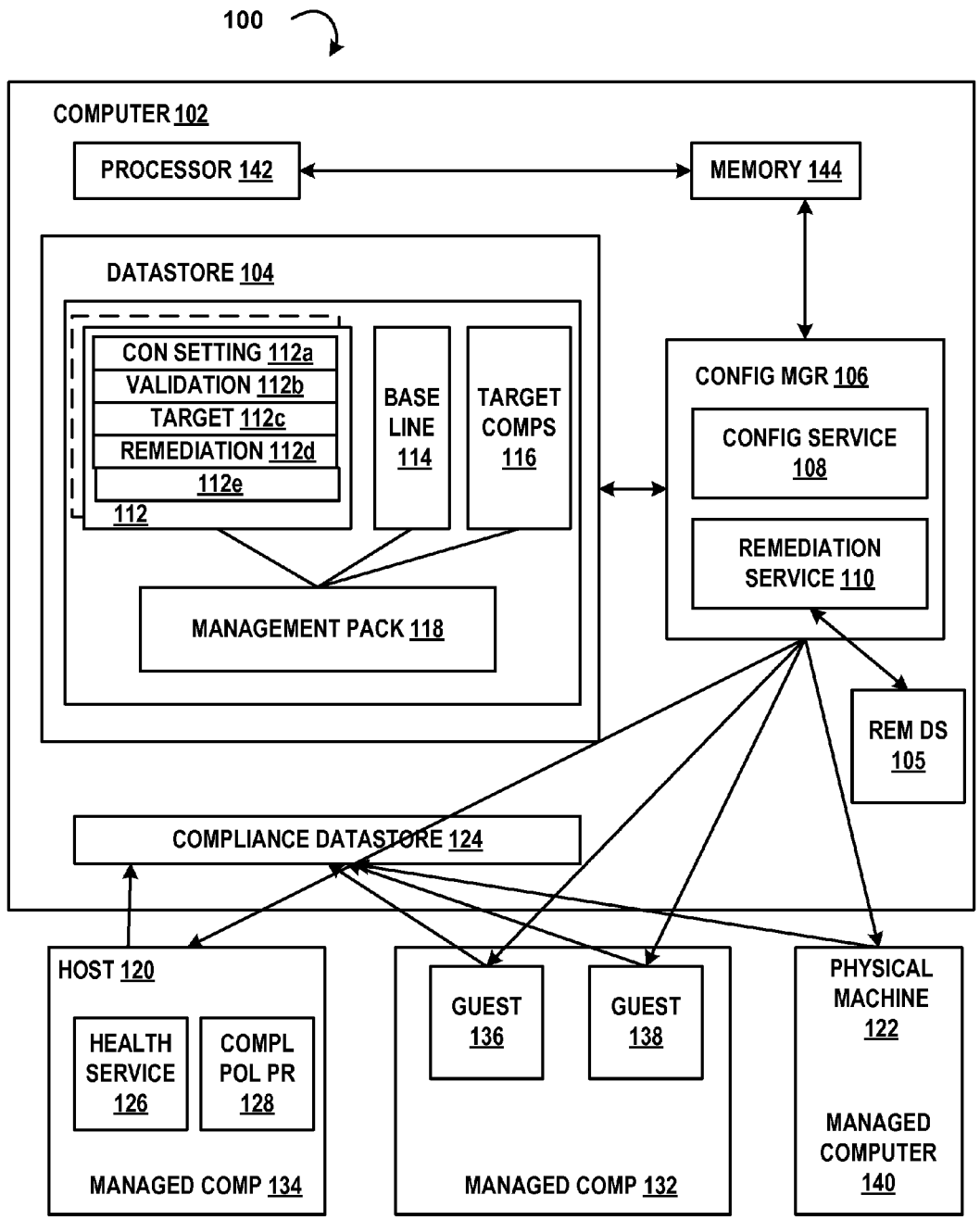
FIG. 1 illustrates an example of a system 100 for managing configuration drift in accordance with aspects of the subject matter disclosed herein.

A model-based approach can be used to manage the desired configuration of a system. A configuration manager provides the ability to measure and manage configuration drift of a system by defining configuration baselines. Configuration baselines can include information concerning operating system configurations, software updates, prohibited and allowed applications and customized settings. The configuration baseline definitions enable the administrator of a data center to manage configuration drift. Maintenance windows can be implemented so that an organization can select a time to apply changes to members of a collection of physical and virtual machines.

The subject matter disclosed herein describes methods, systems and computer program products to provide the ability to manage configuration drift by defining a configuration intent, assessing configuration drift and remediating the configuration drift. A desired configuration can be defined by creating a configuration baseline. A configuration baseline can include a collection of related configuration rules. For example, a configuration baseline for security might include configuration rules related to security issues and so on. A configuration baseline can be defined by a computer administrator or by a software vendor or other user. Often a computer administrator installs software on his computer and tunes the software for his own needs by adjusting multiple setting values. A configuration baseline defined by the software vendor may not be useful in such a case because the software vendor cannot predict which values the administrator might change. Keeping track of the settings changed and finding a location of the settings for defining a new configuration baseline can be tedious.

In accordance with aspects of the subject matter disclosed herein, a user can define a configuration baseline that includes one or more pre-defined configuration rules. Configuration rules can be defined so that a user's intent to check managed computers for compliance is captured. A configuration rule can be associated with a configuration setting and can define the target type, validation and remediation for the configuration setting.

A configuration setting can be any setting of interest (e.g., the name of a registry value, the name of a file property such as a version or a date modified, a name of a program element property and so on). Target type defines the type of managed entity the setting affects (e.g., a program or application such as but not limited to SQL server, IIS server, a database, a service, a website, an operating system, etc.). Defining a target type at more granular level (for example, defining a target at the SQL server or IIS server level rather than at a less granular level such as at a computer level) is helpful in a number of ways. For example, because a target type is specified, if a particular computer does not have the managed entity then there is no need to assess that computer for that configuration rule. Additionally, configuration drift can be reported at more granular level, that is, at the level of the managed entity. For example, a configuration drift report can report, for example, that a SQL server on a particular computer is misconfigured but the IIS server is not, rather than reporting that something on this particular computer is misconfigured.

Validation defines the desired value or range of values of the setting (e.g., greater than 2, equals Nov. 23, 2009, etc.) so that compliance or noncompliance of a setting on a particular machine or group of machines can be determined. Remediation defines a set of commands to run to get or return the setting to its desired value, as defined in the validation. In accordance with aspects of the subject matter disclosed herein, a configuration baseline can be created by reading the configuration of an existing computer. For example, the configuration of a computer that is configured in a desired way can be read and used to create a configuration baseline for other computers. A software vendor defined configuration baseline can be updated by software that reads the pre-configured computer and modifies the vendor-defined baseline appropriately to create a configuration baseline for a new instance of the software. Configuration baselines, rules and settings can be stored in a configuration datastore.

Once a configuration baseline is defined, the defined configuration can be assigned to a group of computers. Periodically, in accordance with a schedule, or on demand, each computer in the group or a subset of the computers in the group can be evaluated against the configuration baselines assigned to it. If the evaluation determines that a computer has a value for a setting that does not match the value specified in the configuration rule for the same setting, the computer is determined to be drifted from the desired configuration. Aspects of the subject matter disclosed herein enable a user to check one or more datacenter computers for compliance and alert the user to compliance drift.

When the configuration of a computer deviates from the baseline configuration for that computer, configuration drift has occurred. When the computer is determined to be drifted from the desired configuration for a configuration rule, the computer administrator can perform a remediation action on that computer for the configuration rule. The remediation action runs the set of commands specified for the remediation to remove the configuration drift for the computer for the configuration rule. Remediation can be performed for multiple configuration rules for the same computer. In accordance with aspects of the subject matter disclosed herein, the remediation can be performed in a controlled manner. For example, the administrator can choose to perform the remediation automatically in the next servicing window of the computer so that, for example, users of the computer are not affected. Alternatively, the administrator is provided the option to perform the remediation on demand (substantially immediately).

A management pack can be generated from the configuration baseline. The management pack can include a user-specified intent model that facilitates the generation of a compliance policy and evaluation of the managed computer against the generated compliance policy. The management pack can be sent to the managed computer so that a policy processing engine on the managed computer can generate compliance reports based on the current state (e.g., the actual value of the settings) and user-specified intent model and can display an intended or expected value. Managed computers in the datacenter can be checked for compliance against one or more defined configuration baselines in either a scheduled fashion or on-demand. For an on-demand scan, the system enables the user to selectively run a pre-defined configuration baseline or a configuration rule against a specific managed computer in the datacenter. Even in the absence of a configuration drift, the system offers the user scan information that can include the intended value of the setting of interest, the actual value of the setting, the last scan time and the state of the scan itself (e.g., whether the scan is in progress, or if it failed or succeeded).

Compliance status can be calculated in a distributed fashion. That is, instead of evaluating compliance at the datacenter management computer, each managed computer can run a compliance policy processing engine that evaluates a configuration policy against its current state. All remediation tasks, tasks that recover from configuration drift, can be scheduled on the datacenter management computer. A remediation task status (scheduled, in-progress, completed or failed) can be set as a status on the configuration rule.

A configuration baseline can be associated with a specific instance or with all instances of a machine tier template within a service template. This enables the application of configuration rules including validations and remediation for each of the newly provisioned machines that are being deployed as a part of template deployment or during the scale-out of a tier of machines. Remediation can be scheduled or can be executed on demand. Guided compliance activities can be performed in three phases. The three phases are scanning a setting, performing the compliance scan and reporting the compliance information. Each of the three phases can be independently modeled so that different settings of interest can be used for each of the phases.

Managing Configuration Drift

FIG. 1 illustrates an example of a system 100 for managing configuration drift in accordance with aspects of the subject matter disclosed herein. All or portions of system 100 may reside on one or more computers such as the computers described below with respect to FIG. 5. Alternatively, system 100 or portions thereof may be provided as a stand-alone system or as a plug-in or add-in. All or portions of system 100 may reside on a datacenter system center computer. All or portions of system 100 can reside on a managed computer.

Computers managed by system 100 can comprise one or more physical machines, one or more virtual machines or any combination of physical and virtual machines. In FIG. 1, managed computer 140 represents a physical machine 122. Managed computer 134 represents a virtual machine host 120 and managed host computer 132 hosts two virtual guest machines, guest 136 and guest 138. A virtual machine (VM) is a software implementation of a computer that executes programs like a physical machine. In data center virtualization, an abstract layer is created between applications and the underlying server, storage and network infrastructure. Virtual machines can allow the underlying physical machine resources to be shared between different virtual machines. Virtualization can create one logical entity from multiple physical entities or can create many logical entities from one physical entity comprising computing, storage, network or application resources.

Each virtual machine may run its own operating system. The software layer providing the virtualization is called a virtual machine monitor or hypervisor. A hypervisor can run directly on the hardware or on top of an operating system. In virtual machine environments, multiple operating system environments can co-exist on the same computer, but maintain isolation from each other. A virtual machine can comprise a set of electronic files that operate as an additional distinct computer system within the confines of another physical host computer system.

System 100 may include one or more computers such as computer 102. The one or more computers may include one or more of: a processor (such as processor 142), a memory such as memory 144, and one or more modules for managing configuration drift on one or more computers. Other components well known in the arts may also be included but are not here shown. It will be appreciated that the module(s) for managing configuration drift can be loaded into memory 144 to cause one or more processors such as processor 142 to perform the actions attributed to the module(s) for managing configuration drift. The module(s) for managing configuration drift may include a configuration manager such as configuration manager 106. Configuration manager 106 can include a configuration service such as configuration service 108 and a remediation service such as remediation service 110.

Configuration manager 106 and remediation service 110 can communicate with a number of computers, physical or virtual, host or guest, as described above. In accordance with aspects of the subject matter disclosed herein, configuration information for a managed computer or group of computers can be entered on a datacenter system center computer, such as computer 102. A configuration baseline can be created and the configuration baseline can be assigned to a target computer or to a group of target computers (managed computers). The configuration baseline can be created by creating a set of configuration rules 112, etc. Configuration baselines can be stored in a configuration data store such as datastore 104.

A configuration rule such as configuration rule 112 can be created by selecting a particular setting, such as configuration setting 112a, and providing a value, list of values or range of values for the setting. A validation algorithm such as validation 112b can be created, that can determine whether an assigned value complies with an acceptable value or list/range of values. The configuration rule can also include specification of a target type such as target 112c. For example, a target type can be any managed entity including but not limited to a program, application, service, database, website, operating system and so on. A target system or group of target computers can be specified. The configuration rule can include an action or set of actions to be taken to return the setting to a desired value. The process of returning one or more settings to a desired value or values is called remediation. Remediation 112d represents these actions in FIG. 1.

A desired value for the setting can be assigned to the setting by a user, or by getting a value for the setting from a particular managed computer, such as, for example, from managed computer 134 or from managed computer 132 or from managed computer 140, etc. An alert rule can also be specified that describes how a noncompliant value is communicated and to whom the alert is delivered. Other information may also be added to the configuration rule, represented by 112e. A set of configuration rules such as configuration rule 112, etc. can be created and collected into one or more configuration baselines such as configuration baseline 114. A configuration baseline can be assigned to one or more target computers such as target computers 116. Configuration baselines, rules and target groups can be stored in a configuration datastore or database (e.g., datastore 104).

The above described information can be collected and used to generate a management pack such as management pack 118. The management pack can identify the location to which the information is sent and can describe how to run the tests that will determine whether or not a managed computer is compliant. A configuration service such as configuration service 108 can then distribute the management pack (e.g., management pack 118) to the computers that are identified in the targets of the configuration baselines.

A health service such as health service 126 on a managed computer such as managed computer 134 can operate to run the tasks for the configuration that are described in the management pack. Included in the tasks described in the management pack can be generation of a compliance policy. A compliance policy processor such as compliance policy processor 128 can determine whether the managed computer (e.g., managed computer 134) is complying with one or more configuration baselines. Reports, such as but not limited to reports illustrated with respect to FIGS. 3 and 4, and described more fully below, may be generated. The reports can be displayed on a monitor or other display device or can be printed. The reports can include information concerning suggested values to which one or more settings may be set. It will be appreciated that several programs may use the same setting or settings. In this case, rules can be combined so that the suggested value complies with more than one application's requirements. For example, one application may specify that a value for a particular setting is greater than 3 while a second application may specify that the value for that setting is less than 7. The compliance report can suggest that the value for the setting be set to 4, 5 or 6. Moreover, the compliance report may propose a particular choice such as 5.

Compliance results including configuration drift information can be sent to or retrieved by the datacenter system center computer and can be stored in a compliance datastore such as compliance datastore 124. Remediation, can be performed automatically either immediately (on-demand) or scheduled for a future time, such as during the next maintenance window. Instead, a user may be notified of the need for remediation and remediation can be performed manually. Information can be presented to the user that includes both the compliance status of a computer and an action taken by user. For example, information can be presented to the user that indicates that a particular instance of an application on a particular computer is noncompliant for a particular rule and that remediation has been scheduled for next maintenance window or has not yet been scheduled.

All remediations that have been done over a period of time can be retained or stored in a remediation datastore such as remediation datastore 105 so that if another similar system or instance is added, all of the retained remediations can be applied to the new system. Suppose for example, a machine was set up using a pre-created operating system image, and subsequently remediations were applied to the machine. If the same image is used to deploy another system, the changes made by the remediations will be lost. In accordance with aspects of the subject matter disclosed herein, all the remediations made are retained. When the operating system image is used to deploy another system, the retained remediations are applied to the new system, eliminating configuration drift.

Figure 3:
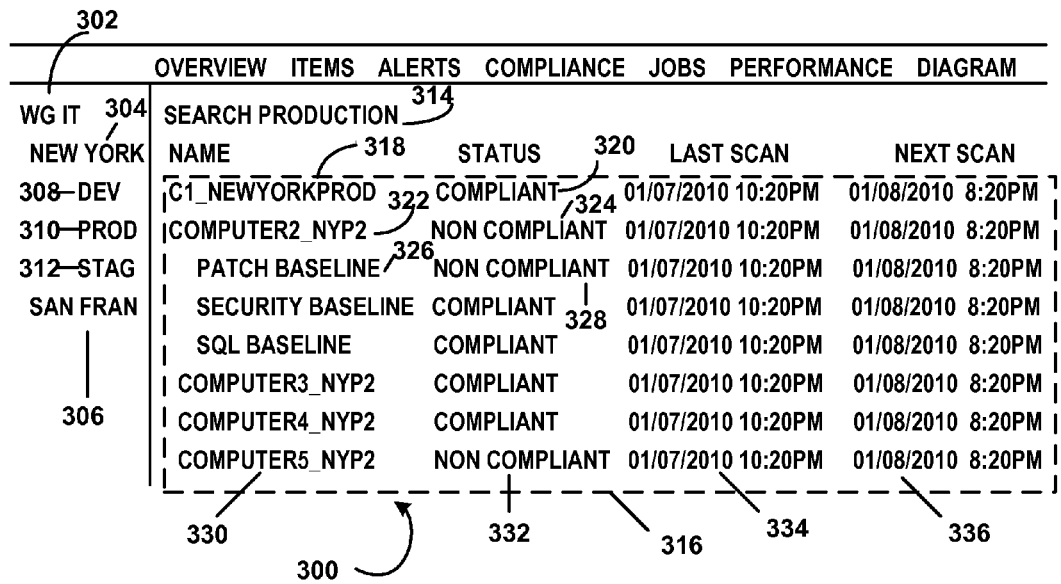
FIG. 3 is an example of a report that can be generated for managing configuration drift in accordance with aspects of the subject matter disclosed herein as described with respect to FIG. 1.

FIG. 3 is an example of a compliance report that can be produced. FIG. 3 represents a compliance report for a company Woodgrove IT (WG IT 302), that has two sites, one in New York (NEW YORK 304) and one in San Francisco (SAN FRAN 306). The New York site has three groups of machines, a development group (DEV 308), a production group (PROD 310) and a staging group (STAG 312). In the example, a user has selected the production group of machines (reflected in the heading SEARCH PRODUCTION 314) to receive a report on. The machines listed in the body 316 of the report represent the production machines in the New York site. It can be seen from the report that the computer with the identifier C1_NewYorkProd 318 is compliant 320 while the computer with the identifier Computer2_NYP2 322 is noncompliant 324. Moreover, compliance report 300 shows what kind of baseline is noncompliant.

In FIG. 3, the Patch Baseline 326 is noncompliant 328. All the other computers listed on the report are compliant except for Computer5_NYP2 330 which is non-compliant 332. Selecting Computer5_NYP2 330 can result in a list of compliant and noncompliant application baselines for Computer5_NYP2 330. Hence this report can provide information concerning a given computer's or group of computers' state of compliance or non-compliance with configuration baselines associated with those computers. If a particular computer or group of computers is not compliant, the report can provide information that identifies which machines are complaint and which machines are not compliant and for which particular rule or rules within the configuration baseline the machine is noncompliant. Other information presented can include but is not limited to a time and date of a last scan 334 and time and date of a next scheduled scan 336.

Figure 2:
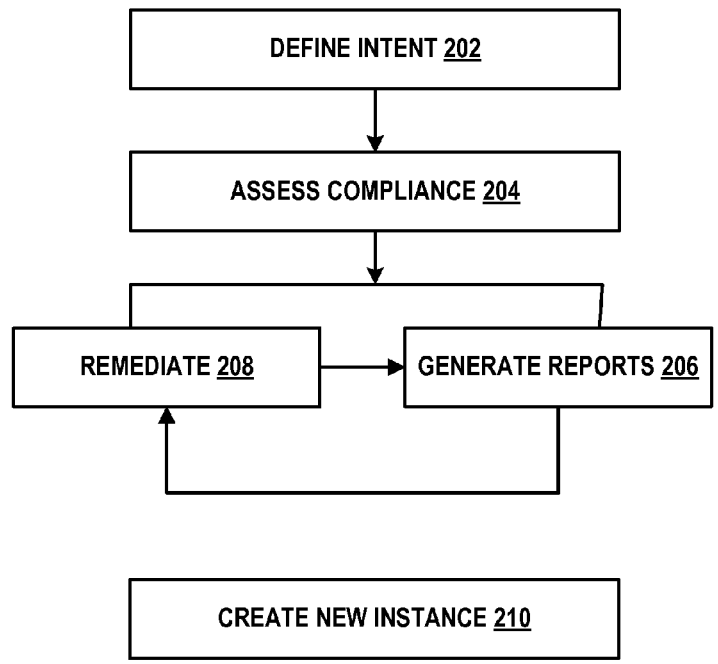
FIG. 2 is a flow diagram of an example of a method 200 for automatically managing configuration drift in accordance with aspects of the subject matter disclosed herein as described with respect to FIG. 1.

FIG. 2 illustrates an example of a method 200 for managing configuration drift in accordance with aspects of the subject matter disclosed herein. The method described or portions thereof may be performed by system 100 or portions thereof as described above with respect to FIG. 1. At 202 a design intent can be defined.

Configuring a computer is more than just selecting a setting and assigning a value to the setting. It can be a challenging task. Firstly, the sheer number of settings involved is challenging. On any computer there are a very large number of possible settings. The number of possible settings can be well beyond what a user can manage and may even be beyond what an automated system can verify. Each of those settings can be assigned multiple values. In accordance with aspects of the subject matter disclosed herein, a specific set of settings are identified for monitoring.

Secondly, neither an application provider nor a user, on his own, may be able to effectively create a configuration baseline. An application vendor may know what settings affect its application but may not know what value for the setting will operate most effectively in a user's environment. For example, the provider of a SQL application may know that the functionality of the application relies on a particular registry key, but not know what value the registry key will be set to in the user's environment. Similarly, a user may not know what settings affect an application that runs on his system but may well have tuned the system by setting the value of certain settings to values that result in the application performing well in the user's environment. In accordance with aspects of the subject matter disclosed herein, a user who may not know what settings are involved or what the values for the settings are, can identify a machine that is configured in a desired way. An automated feature can read the settings of a machine that performs well and the values for the settings from the identified machine can be used to create a baseline configuration or portions thereof. The values and settings read from the identified machine can include operating system settings or application level settings. The baseline configuration created can be used to assess compliance of a new instance of a service or a new machine.

Finally, in addition to the challenges described above, another challenge is that a dependency or multiple dependencies can exist between settings. That is, any given setting may be used by more than one program or application. Hence, in the course of changing the value of one setting, a user may affect the running of another program or application in an adverse way. For example, suppose a certain setting is used by both application A and application B. If a user changes the setting for application A, application B may need to be restarted because a value that application B expects to be unchanging throughout its execution has unexpectedly changed. It will be appreciated that this is just one example of how dependencies between applications affect configuration management. Hence, in accordance with aspects of the subject matter disclosed herein, an automated feature can determine applications that are affected by a setting value change and can automatically restart any affected programs or applications.

Moreover, if more than one program depends on a particular setting and a first program depends on the value of a setting to be in a first range and the second program depends on the value of the setting to be in a second range, an automated feature can combine the rules to determine a value that works with both the first and second programs. For example, the automated feature may determine a value for the setting that is both in the first and in the second range. It will be appreciated that although in the example described above, there are two programs that both use a particular setting, the automated feature is not limited to two applications: any number of application value ranges can be evaluated to determine a value that works with all or most of the applications. A validation can be generated that validates for all the programs affected by the setting. The automated feature may adjust any affected configuration rules.

Alternatively, a setting to be configured can be selected and a value can be chosen for the setting. A configuration setting can be defined by using a vendor's model settings, or by starting with a vendor's model settings and modifying them by reading the settings for another machine and changing the vendor's model settings to match. As described above, a configuration rule can include a configuration setting, a validation, a target type and a set of actions that remediate configuration drift (a remediation). In accordance with aspects of the subject matter disclosed herein, the target type for each rule can be defined at the level of a managed entity such as at an application, program or operating system level of granularity. For example, a user can specify that the target associated with a particular rule is a particular application such as but not limited to SQL server, Exchange server or application A, etc., is a website such as but not limited to an IIS website, is a database such as but not limited to a SQL database and so on. A target defined at this level of granularity enables more informative reporting as described above and also enables more targeted assessment, as described more fully below.

At 204 a machine or set of machines can be evaluated for compliance with the configuration baseline for that machine or set of machines. The user can control which machine or group of machines is evaluated. The user can control for which configuration rule a machine or group of machines is evaluated. Scheduling of the assessment can be controlled or alternatively, assessment can be performed immediately on demand. Because the target is defined at the level of a managed entity, the assessment process is streamlined because only machines that have the target application or program are assessed. For example, if a configuration rule in the configuration baseline for machine A specifies only a target type of a particular type of email application for a particular setting and machine A does not have that particular type of email application on it, then that setting does not need to be evaluated on that machine.

At 206, information concerning the assessment can be presented to the user. The information can be presented in the form of printed reports or displays and so on. Because the target is defined at the level of a managed entity, the information that is presented to the user can be more informative. For example, instead of reporting only that a particular machine is noncompliant with the configuration baseline, the information presented to the user can also include the particular application or program that is not in compliance, as described above with respect to FIG. 3.

At 208 remediation can be performed. Remediation refers to the set of activities that are performed to correct configuration drift so that the remediated machine is returned to a state of compliance with the configuration baseline. Remediation can be performed manually or can be performed automatically. Remediation can be performed on one or more computers (e.g., only on a selected computer or group of computers). Remediation can be restricted to only settings associated with one or more selected configuration rules on one or more computers. If a machine has been determined to have drifted, the user can opt to have remediation performed automatically, or the user can opt to perform the remediation manually. If a user selects automatic remediation, the automatic remediation can be performed immediately or can be performed in the next maintenance window of the machine. If, for example, a machine serves a number of users, performing the remediation in the maintenance window can ensure that the system is operative when users want to use it.

At 210, a new instance of an application, program, group of applications, operating system or machine can be created from an existing operating system image without configuration drift. In accordance with aspects of the subject matter disclosed herein, any remediations that are applied are retained and are used when a new instance is created.

Figure 4:
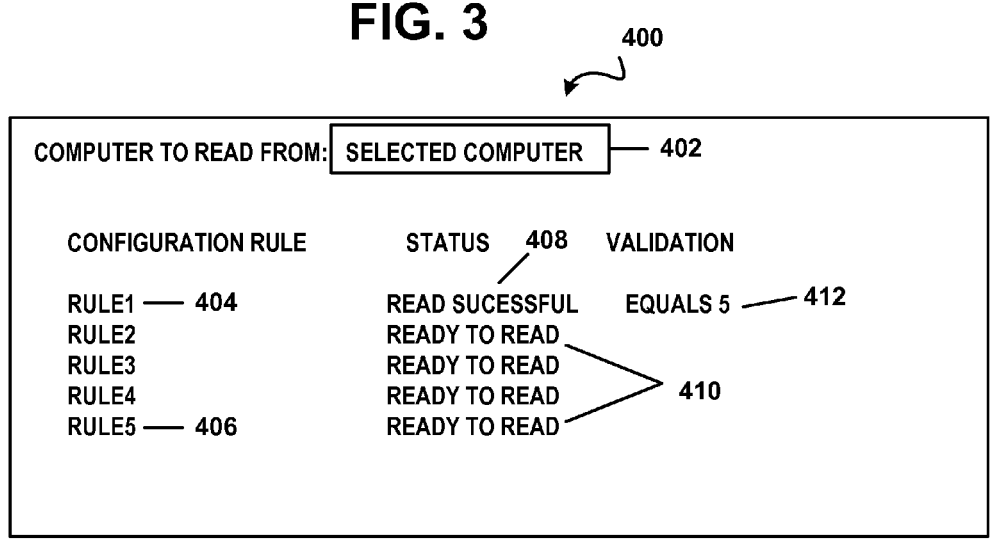
FIG. 4 is an example of another report that can be generated for managing configuration drift in accordance with aspects of the subject matter disclosed herein as described with respect to FIG. 2.

FIG. 4 is an example of a report 400 that can be generated. Report 400 displays the results of reading the configuration of a selected computer, selected computer 402. For each rule (e.g., Rule 1 404 through Rule 4 406, the report shows the status (e.g., the rule has been read successfully 408 or the rule is ready to read, 410) and the validation rule (e.g., Equals 5 412). In FIG. 4, selected computer 402 may represent a computer that is a model for creation of a new instance. An automated feature can contact the selected computer and can read the values for each of the settings defined in the configuration baseline. This configuration baseline can be applied to other servers as desired. The validation rule column (Equals 5 412 for Rule 1 404) indicates the value of the configuration setting for the corresponding rule on the selected computer 402. Each rule can be pointed to a different computer. For example, Rule 1 can be set to point to computer 1 and Rule 2 can be set to point to computer 2, and so on for each rule in the configuration baseline. In response, the configuration setting will be read from computer 1 for the configuration setting for Rule 1 and will be read from computer 2 for the configuration setting for Rule 2. This enables the user to create portions of a configuration baseline from multiple machines. That is, a configuration baseline can be created from a combination of one machine that is well-configured for a first target such as a SQL application, from a second machine that is well-configured for a second target such as the operating system, from a third machine that is well-configured for another application and so on.

Example of a Suitable Computing Environment

Figure 5:
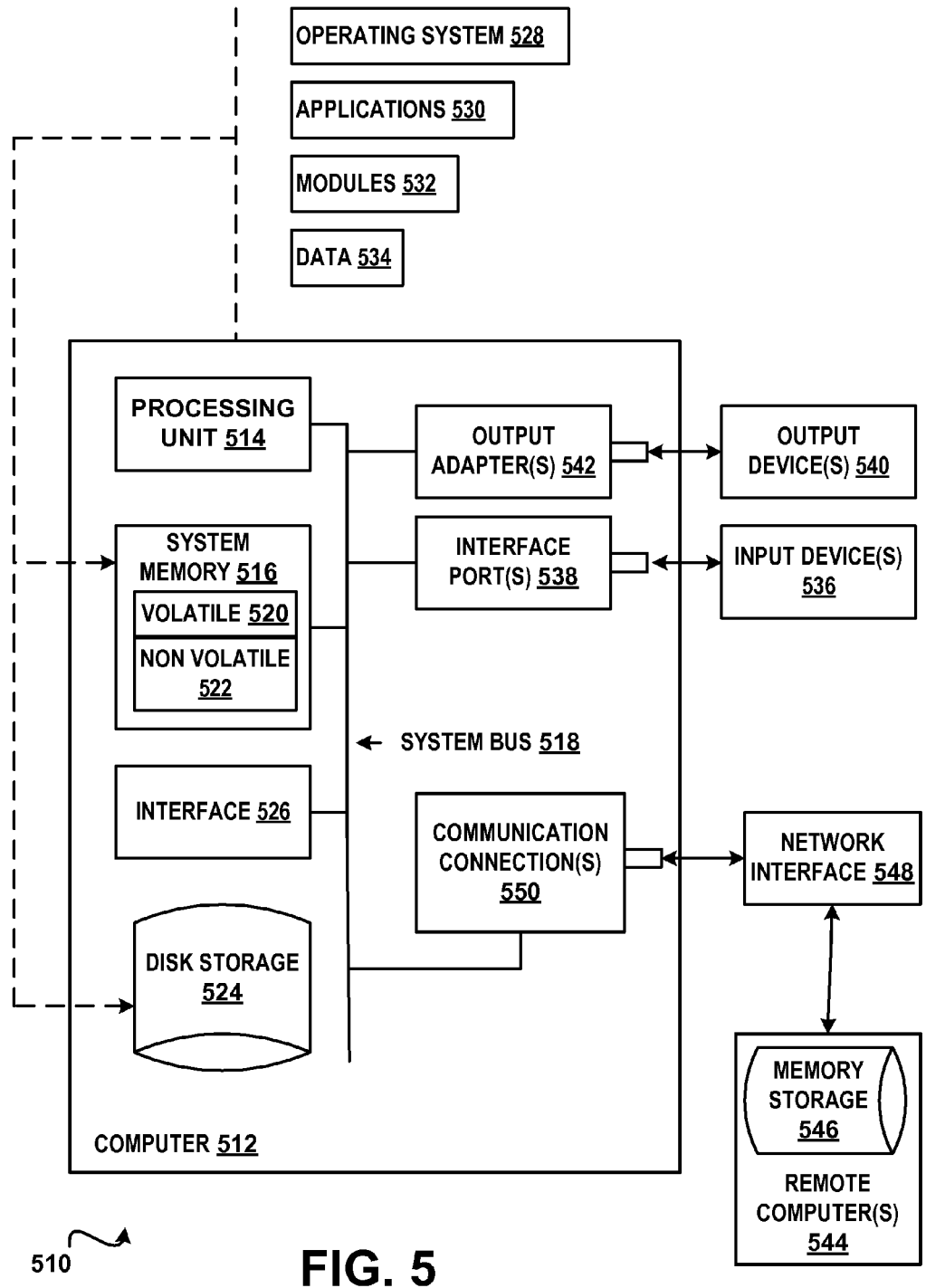
FIG. 5 is a block diagram illustrating an example of a computing environment in which aspects of the subject matter disclosed herein may be implemented.

In order to provide context for various aspects of the subject matter disclosed herein, FIG. 5 and the following discussion are intended to provide a brief general description of a suitable computing environment 510 in which various embodiments may be implemented. While the subject matter disclosed herein is described in the general context of computer-executable instructions, such as program modules, executed by one or more computers or other computing devices, those skilled in the art will recognize that portions of the subject matter disclosed herein can also be implemented in combination with other program modules and/or a combination of hardware and software. Generally, program modules include routines, programs, objects, physical artifacts, data structures, etc. that perform particular tasks or implement particular data types. Typically, the functionality of the program modules may be combined or distributed as desired in various embodiments. The computing environment 510 is only one example of a suitable operating environment and is not intended to limit the scope of use or functionality of the subject matter disclosed herein.

With reference to FIG. 5, a computing device for efficient resumption of co-routines on a linear stack in the form of a computer 512 is described. Computer 512 may include a processing unit 514, a system memory 516, and a system bus 518. The processing unit 514 can be any of various available processors. Dual microprocessors and other multiprocessor architectures also can be employed as the processing unit 514. The system memory 516 may include volatile memory 520 and nonvolatile memory 522. Nonvolatile memory 522 can include read only memory (ROM), programmable ROM (PROM), electrically programmable ROM (EPROM) or flash memory. Volatile memory 520 may include random access memory (RAM) which may act as external cache memory. The system bus 518 couples system physical artifacts including the system memory 516 to the processing unit 514. The system bus 518 can be any of several types including a memory bus, memory controller, peripheral bus, external bus, or local bus and may use any variety of available bus architectures.

Computer 512 typically includes a variety of computer readable media such as volatile and nonvolatile media, removable and non-removable media. Computer storage media may be implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other non-transitory medium which can be used to store the desired information and which can be accessed by computer 512.

It will be appreciated that FIG. 5 describes software that can act as an intermediary between users and computer resources. This software may include an operating system 528 which can be stored on disk storage 524, and which can control and allocate resources of the computer system 512. Disk storage 524 may be a hard disk drive connected to the system bus 518 through a non-removable memory interface such as interface 526. System applications 530 take advantage of the management of resources by operating system 528 through program modules 532 and program data 534 stored either in system memory 516 or on disk storage 524. It will be appreciated that computers can be implemented with various operating systems or combinations of operating systems.

A user can enter commands or information into the computer 512 through an input device(s) 536. Input devices 536 include but are not limited to a pointing device such as a mouse, trackball, stylus, touch pad, keyboard, microphone, and the like. These and other input devices connect to the processing unit 514 through the system bus 518 via interface port(s) 538. An interface port(s) 538 may represent a serial port, parallel port, universal serial bus (USB) and the like. Output devices(s) 540 may use the same type of ports as do the input devices. Output adapter 542 is provided to illustrate that there are some output devices 540 like monitors, speakers and printers that require particular adapters. Output adapters 542 include but are not limited to video and sound cards that provide a connection between the output device 540 and the system bus 518. Other devices and/or systems or devices such as remote computer(s) 544 may provide both input and output capabilities.

Computer 512 can operate in a networked environment using logical connections to one or more remote computers, such as a remote computer(s) 544. The remote computer 544 can be a personal computer, a server, a router, a network PC, a peer device or other common network node, and typically includes many or all of the elements described above relative to the computer 512, although only a memory storage device 546 has been illustrated in FIG. 4. Remote computer(s) 544 can be logically connected via communication connection 550. Network interface 548 encompasses communication networks such as local area networks (LANs) and wide area networks (WANs) but may also include other networks. Communication connection(s) 550 refers to the hardware/software employed to connect the network interface 548 to the bus 518. Connection 550 may be internal to or external to computer 512 and include internal and external technologies such as modems (telephone, cable, DSL and wireless) and ISDN adapters, Ethernet cards and so on.

It will be appreciated that the network connections shown are examples only and other means of establishing a communications link between the computers may be used. One of ordinary skill in the art can appreciate that a computer 512 or other client device can be deployed as part of a computer network. In this regard, the subject matter disclosed herein man pertain to any computer system having any number of memory or storage units, and any number of applications and processes occurring across any number of storage units or volumes. Aspects of the subject matter disclosed herein may apply to an environment with server computers and client computers deployed in a network environment, having remote or local storage. Aspects of the subject matter disclosed herein may also apply to a standalone computing device, having programming language functionality, interpretation and execution capabilities.

The various techniques described herein may be implemented in connection with hardware or software or, where appropriate, with a combination of both. Thus, the methods and apparatus described herein, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing aspects of the subject matter disclosed herein. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects, e.g., through the use of a data processing API or the like, may be implemented in a high level procedural or object oriented programming language to communicate with a computer system. However, the program(s) can be implemented in assembly or machine language, if desired. In any case, the language may be a compiled or interpreted language, and combined with hardware implementations.

While the subject matter disclosed herein has been described in connection with the figures, it is to be understood that modifications may be made to perform the same functions in different ways.

What is claimed:

1. A system comprising:
a processor and a memory including a module configured to cause the processor to:
manage configuration drift of a plurality of computers by:
defining a configuration baseline for the plurality of computers by defining a collection of configuration rules, wherein each of the collection of configuration rules is associated with a target comprising a managed entity comprising a program, a service, an application, a database, an operating system or a website, wherein a configuration rule of the collection of configuration rules includes a set of commands to automatically run to remediate configuration drift for the configuration rule to return a target to a state of compliance with the configuration baseline, wherein the configuration baseline is created by combining at least one configuration setting read from each of a plurality of existing computers;
generating a management pack based on the defined configuration baseline including the collection of configuration rules;
sending the management pack to at least one of the plurality of computers; and
receiving information from the at least one of the plurality of computers, the information comprising an assessment of configuration drift of the at least one of the plurality of computers based on an assessment of the at least one of the plurality of computers for configuration drift performed by the at least one of the plurality of computers based on the management pack, configuration drift comprising deviation from the configuration baseline of an actual configuration of the at least one computer.

2. The system of claim 1, wherein the module assesses configuration drift on demand.

3. The system of claim 1, wherein configuration drift is assessed only for a particular computer of the plurality of computers for a particular configuration rule of the collection of configuration rules.

4. The system of claim 1, wherein all remediations performed on a service over a period of time are retained and are applied to a new instance of the service, eliminating configuration drift.

5. A method comprising:
managing configuration drift of a plurality of managed computers from a datacenter management computer by executing at least one module on the datacenter management computer, the at least one module:
defining a configuration baseline for the plurality of managed computers by defining a collection of configuration rules, wherein each of the collection of configuration rules is associated with a target comprising a managed entity comprising a program, an operating system, a service, an application, a database, or a website, wherein the configuration baseline is created by combining at least one configuration setting read from each of a plurality of machines;
generating a management pack based on the defined configuration baseline including the collection of configuration rules;
sending the management pack to at least one of the plurality of computers;
receiving information from the at least one of the plurality of computers, the information comprising an assessment of configuration drift of the at least one of the plurality of computers based on an assessment of the at least one of the plurality of managed computers for configuration drift performed by the at least one of the plurality of computers based on the management pack, configuration drift comprising deviation from the defined configuration baseline of an actual configuration of the at least one computer;

determining that the at least one computer has drifted from at least one configuration rule of the collection of configuration rules comprising the defined configuration baseline; and remediating on demand only settings associated with the at least one configuration rule on the at least one drifted computer using a set of commands to remediate configuration drift to return the at least one drifted computer to a state of compliance with the configuration baseline.

6. The method of claim 5, further comprising:
in response to determining that a dependency exists between a first configuration rule and a second configuration rule of the collection of configuration rules such that a particular setting is associated with both the first configuration rule and the second configuration rule, determining a value for the particular setting that complies with validation conditions for both the first configuration rule and the second configuration rule.

7. The method of claim 6, further comprising:
displaying a suggested value for the particular setting that complies with the validation conditions for both the first configuration rule and the second configuration rule.

8. The method of claim 5, wherein defining a configuration baseline is performed by identifying a first configuration rule of the configuration baseline, the first configuration rule associated with a first target, to a first computer and identifying a second configuration rule of the configuration baseline to a second different computer, the second configuration rule associated with a second different target.

9. The method of claim 8, wherein in response to identifying the first configuration rule of the configuration baseline to the first computer, settings for the first target are set to the settings of the first computer for the first configuration rule and wherein in response to identifying the second configuration rule of the configuration baseline to the second computer, settings for the second target are set to the settings of the second computer for the second configuration rule.

10. The method of claim 5, further comprising:
performing the assessing of the at least one computer for configuration drift on demand.

11. The method of claim 5, further comprising:
changing a value of a setting of a first configuration rule of the collection of configuration rules; and in response to determining that a dependency exists between the first configuration rule and a second configuration rule of the collection of configuration rules, automatically restarting a target of the second configuration rule, the target of the second configuration rule comprising a managed entity comprising a program, an operating system, a service, an application, a database, or a website.

12. A computer-readable storage memory comprising computer-executable instructions which when executed cause at least one processor to:
manage configuration drift of a plurality of computers by:
defining a baseline configuration for the plurality of computers by defining a collection of configuration rules, wherein each of the collection of configuration rules is associated with a target, wherein the target is defined at a level of a managed entity, wherein the configuration baseline is created by combining at least one configuration setting read from each of a plurality of existing computers;

generating a management pack based on the defined configuration baseline including the collection of configuration rules;

sending the management pack to at least one of the plurality of computers;

receiving information from the at least one of the plurality of computers, the information comprising an assessment of configuration drift of the at least one of the plurality of computers based on an assessment of the at least one of the plurality of computers for configuration drift performed by the at least one of the plurality of computers based on the management pack, configuration drift comprising deviation from the configuration baseline of an actual configuration of the at least one computer; and in response to determining that at least one computer of the plurality of computers is not in compliance with at least one configuration rule of the collection of configuration rules of the configuration baseline, scheduling remediation of the at least one computer for the next maintenance window for the at least one computer for the at least one configuration rule for which the at least one computer is out of compliance, the remediation comprising a set of commands to remediate configuration drift to return the at least one computer to a state of compliance with the configuration baseline.

13. The computer-readable storage memory of claim 12, comprising further computer-executable instructions, which when executed cause the at least one processor to:
report that the at least one computer of the plurality of computers is not in compliance and that remediation for the at least one configuration rule has been scheduled.

14. The computer-readable storage memory of claim 13, comprising further computer-executable instructions, which when executed cause the at least one processor to:
define a baseline configuration for a new instance of a service by reading at least one rule of a configuration baseline of an existing computer for the service and setting values for settings for the service for the new instance to the values of the settings for the existing computer.

15. The computer-readable storage memory of claim 13, comprising further computer-executable instructions, which when executed cause the at least one processor to:
display a list of computers that are compliant with the configuration baseline and computers that are non-compliant with the configuration baseline.

16. The computer-readable storage memory of claim 15, comprising further computer-executable instructions, which when executed cause the at least one processor to:
display the target for the non-compliant computers.

17. The computer-readable storage memory of claim 12, comprising further computer-executable instructions, which when executed cause the at least one processor to:
create a new instance of a service wherein configuration drift for the new instance is eliminated by retaining all remediations performed on the service over a period of time and applying all retained remediations to the new instance of the service.

18. The system of claim 1, wherein the configuration baseline includes information regarding at least one allowed application and at least one prohibited application.

* * * * *